United States Patent [19]

Hashimoto et al.

[11] Patent Number: 5,256,363
[45] Date of Patent: Oct. 26, 1993

[54] POLYETHYLENE TEREPHTHALATE AND USES THEREOF

[75] Inventors: Mikio Hashimoto, Ootake; Hiroji Niimi, Iwakuni; Tadao Yatsu, Iwakuni; Shigemi Shiraki, Iwakuni, all of Japan

[73] Assignee: Mitsui Petrochemical Industries, Ltd., Tokyo, Japan

[21] Appl. No.: 985,752

[22] Filed: Dec. 4, 1992

Related U.S. Application Data

[63] Continuation of Ser. No. 662,978, Feb. 28, 1991, abandoned, which is a continuation of Ser. No. 538,698, Jun. 18, 1990, abandoned, which is a continuation of Ser. No. 439,011, Nov. 21, 1989, abandoned, which is a continuation of Ser. No. 173,100, Mar. 28, 1988, abandoned.

[30] Foreign Application Priority Data

Mar. 26, 1987 [JP] Japan .................. 62-70215

[51] Int. Cl.⁵ .................................. B29C 45/14
[52] U.S. Cl. ........................ 264/259; 528/272; 528/283; 528/308.1; 528/481; 528/503; 264/5; 264/239; 264/500
[58] Field of Search ............ 528/272, 283, 308.1, 528/481, 503; 264/5, 239, 259, 500

[56] References Cited

U.S. PATENT DOCUMENTS

| | | | |
|---|---|---|---|
| 3,644,293 | 2/1972 | Fielder | 528/272 |
| 4,154,920 | 5/1979 | Jabarin | 528/272 |
| 4,223,128 | 9/1980 | Halek et al. | 528/481 |
| 4,260,735 | 4/1981 | Bander et al. | 528/279 |
| 4,340,721 | 7/1982 | Bonnebat et al. | 528/272 |

FOREIGN PATENT DOCUMENTS

| | | |
|---|---|---|
| 686548 | 3/1967 | Belgium . |
| 1197738 | 12/1959 | France . |
| 5450595 | 4/1979 | Japan . |
| 55-36211A | 3/1980 | Japan . |

Primary Examiner—Samuel A. Acquah
Attorney, Agent, or Firm—Sherman and Shalloway

[57] ABSTRACT

Polyethylene terephthalates of the present invention are excellent in mechanical strength, heat resistance and transparency, and therefore blow molded containers molded from the present polyethylene terephthalate are excellent in high temperature filling properties when they are filled with juice, refrigerant beverage, carbonated beverage, seasonings, etc. Furthermore, the blow molded containers prepared from the present polyethylene terephthalates have such characteristic features that they are free from thermal deformation at the time when they are subjected to high temperature filling, they are readily subjected to sterilization treatment and hence excellent in high speed filling properties.

5 Claims, 1 Drawing Sheet

POLYETHYLENE TEREPHTHALATE AND USES THEREOF

This application is a continuation of application Ser. No. 07/662,978, filed Feb. 28, 1991, now abandoned; which is a continuation of application Ser. No. 07/538,698, filed Jun. 18, 1990, now abandoned; which is a continuation of application Ser. No. 07/439,011, filed Nov. 21, 1989, now abandoned; which is a continuation of application Ser. No. 07/173,100, filed Mar. 28, 1988, now abandoned.

FIELD OF THE INVENTION

This invention relates to polyethylene terephthalates excellent in heat resistance and transparency. The invention further relates to preforms for use in molding blow molded articles, said preforms being preformed from the said polyethylene terephthalates and being excellent in heat resistance and transparency, and to blow molded articles molded from the said polyethylene terephthalate; particularly blow molded articles made of heat resistant polyethylene terephthalates excellent in high temperature filling properties.

BACKGROUND OF THE INVENTION

Heretofore, glass has been widely used as a material for use in making containers for seasoning, oil, juice, carbonated beverage, beer, Japanese sake, cosmetics, detergents, etc. Because of high production costs, empty glass containers after use are recovered and recycled for reuse. The above procedure, however, involved such drawbacks that because glass containers are heavy in weight, transport expenses thereof increase and in addition, they are liable to break and also cause inconvenience to handling thereof.

With the view of eliminating such drawbacks associated with the use of glass containers as mentioned above, various attempts have rapidly been made recently to convert the use of containers from glass containers to plastic containers. As materials for plastic containers, there are employed various kinds of plastics, polyethylene terephthalates are employed, because of their excellent mechanical strength, heat resistance, transparency and gas barrier properties, as a material for making containers to contain juice, refrigerant beverage, carbonated beverage, seasoning, detergent, cosmetics, etc. Of these plastic materials, polyethylene terephthalates are employed, because of their excellent mechanical strength, heat resistance, transparency and gas barrier properties, as a material for containers to contain juice, refrigerant beverage, carbonated beverage, seasoning, detergent, cosmetics, etc. Of these uses, particularly blow molded containers for filling juice, refrigerant beverage and carbonated beverage are required to be undergo sterilization and high speed filling operations and, on that account, such blow molded containers are required to be molded from heat resistant resins capable of withstanding the high speed filling and also required to have transparency.

Accordingly, as process for forming heat resistant blow molded containers from polyethylene terephthalates, there have heretofore been proposed a process for lamination such heat resistant resins as polyarylates on containers molded from polyethylene terephthalates [Plastics, Vol. 36 (No. 9), 121. (1985)], a process comprising subjecting containers molded from polyethylene terephthalates to heat setting (Japanese Patent Publn. No. 3301/1984, Japanese Patent L-O-P Publns. Nos. 12031/1980, 75833/1981 and 13142/1981) and a process comprising subjecting containers molded from polyethylene terephthalates to solvent treatment, thereby improving crystallinity index thereof (Japanese Patent Publn. No. 15807/1984). These processes referrred to above are all intended to impart heat-resisting properties by molding means or treatment after molding to polyethylene terephthalates which are originally insufficient in heat resistance. However, blow molded containers obtained by any of these processes fail to satisfy heat resistance at the time of high temperature filling and also transparency as desired. Therefore, earnestly desired is an advent of polyethylene terephthalates capable of withstanding the temperature, pressure and liquid weight at the time of high temperature filling and being excellent in heat resistance and transparency, and of preforms for blow molded articles as well as blow molded containers molded from such polyethylene terephthalates as mentioned above.

OBJECT OF THE INVENTION

The present invention has been accomplished in the light of such circumstances as mentioned above, under which conventional polyethylene terephthalates and blow molded containers molded therefrom are as they are, and an object of the invention is to provide polyethylene terephthalates excellent in heat resistance as well as in transparency, which are used for molding blow molded containers excellent in heat resistance and transparency. Another object of the invention is to provide preforms for blow molded articles as well as blow molded containers, both of which are molded from such polyethylene terephthalates excellent in heat resistance and transparency, particularly those which exhibit excellent heat resistance at the time when blow molded containers molded therefrom are filled at high temperature with juice, refrigerant beverage, carbonated beverage and the like.

Figure 1:
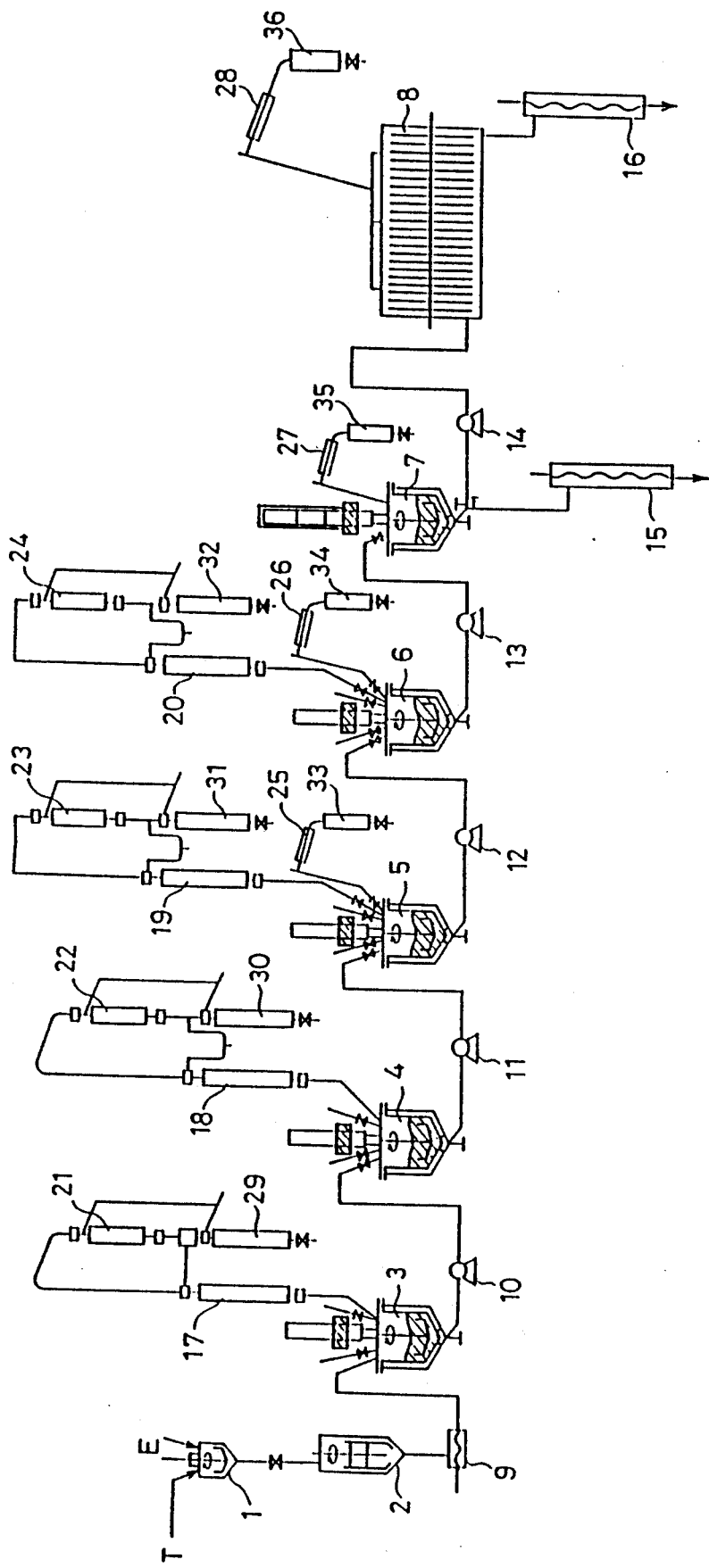
FIG. 1 shows one example of the flow sheets of apparatus for the purpose of illustrating a process for preparing polyethylene terephthalates of the present invention.

| | |
|---|---|
| 1 | Slurry forming tank |
| 2 | Slurry storage tank |
| 3, 4 | Esterification reaction apparatuses |
| 5, 6 | Apparatus for both esterification reaction and polycondensation |
| 7 | Polycondensation apparatus |
| 8 | Horizontal continuous polycondensation apparatus |
| 9 | Slurry pump |
| 10–14 | Pumps |
| 15, 16 | Polyester withdrawing apparatuses |
| 17–20 | Rectifying towers |
| 21–28 | Condensers |
| 29–30 | Receivers |

SUMMARY OF THE INVENTION

In accordance with the present invention, there are provided polyethylene terephthalates characterized by having (A) an ethylene terephthalate repeating unit (a) represented by the general formula [I]

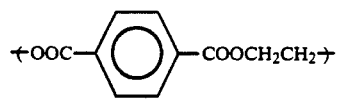

said unit (a) being in the range of from 97.0 to 98.6 mol %, and a dioxyethylene terephthalate repeating unit (b) represented by the general formula [II]

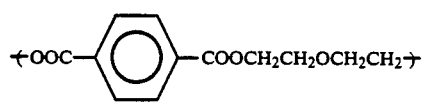

said unit (b) being in the range of from 1.4 to 3.0 mol %, and said two repeating units being random oriented, (B) an intrinsic viscosity [η] as measured at 25° C. in o-chlorophenol being in the range of from 0.70 to 0.90 dl/g, and (C) a crystallizing temperature [Tcc] as measured at a heat-up rate of 10° C./min with a differential scanning calorimeter being at least 165° C., and said heat-up crystallizing temperature [Tcc] in relation to said intrinsic viscosity [η] being in the range represented by the following equation 67.5 [η]+119.0≦[Tcc]≦67.5 [η]+133.5, and preforms for blow molded articles as well as blow molded containers, both of which are molded from said polyethylene terephthalates.

Furthermore, in accordance with the present invention, there are provided polyethylene terephthalates characterized by having (A) an ethylene terephthalate repeating unit (a) represented by the general formula [I]

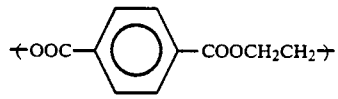

said unit (a) being in the range of from 97.0 to 98.6 mol %, and a dioxyethylene terephthalate repeating unit (b) represented by the general formula [II]

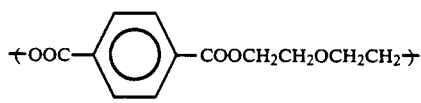

said unit (b) being in the range of from 1.4 to 3.0 mol %, and said two repeating units being random oriented, (B) an intrinsic viscosity [η] as measured of 25° C. in o-chlorophenol being in the range of from 0.70 to 0.90 dl/g, (C) a crystallizing temperature [Tcc] as measured at a heat-up rate of 10° C./min with a differential scanning calorimeter being at least 165° C., and said heat-up crystallizing temperature [Tcc] in relation to said intrinsic viscosity [η] being in the range represented by the following equation 67.5 [η]+119.0≦[Tcc]≦67.5 [η]+133.5, and (D) the number (a) of spherulites formed by isothermal crystallization of said polyethylene terephthalate at 200° C. after melting up to 290° C. being less than $10^8$ pieces/cm$^3$, the difference [(b)−(a)] between said number (a) of the spherulites and the number (b) of spherulites formed by isothermal crystallization of said polyethyl terephthalate at 200° C. after melting up to 280° C. being less than $5 \times 10^7$ pieces/cm$^3$, and preforms for blow molded articles as well as blow molded containers, both of which are molded from said polyethylene terephthalates.

DETAILED DESCRIPTION OF THE INVENTION

In the polyethylene terephthalates of the present invention, the content of ethylene terephthalate repeating unit (a) represented by the general formula [I]

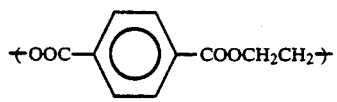

is in the range of from 97.0 to 98.6 mol %, preferably from 97.1 to 98.5 mol %, and particularly preferably from 97.3 to 98.3 mol %, and the content of dioxyethylene terephthalate repeating unit (b) represented by the general formula [II]

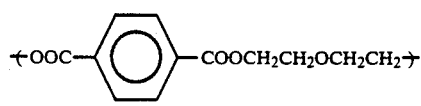

is in the range of from 1.4 to 3.0 mol %, preferably from 1.5 to 2.9 mol %, and particularly preferably from 1.7 to 2.7 mol %.

In the present polyethylene terephthalates, ester bonds are formed by random orientation of the ethylene terephthalate repeating unit (a) represented by the above-mentioned general formula [I] and the dioxyethylene terephthalate repeating unit (b) represented by the above-mentioned general formula [II], whereby substantially linear polyesters are formed. That the present polyethylene terephthalates are substantially linear is confirmed by the fact that said polyethylene terephthalates dissolve in o-chlorophenol.

An intrinsic viscosity [η] as measured at 25° C. in o-chlorophenol of the present polyethylene terephthalates is in the range of from 0.70 to 0.90 dl/g, preferably from 0.71 to 0.87 dl/g, and particularly preferably from 0.72 to 0.85 dl/g. When said intrinsic viscosity of the present polyethylene terephthalates is smaller than 0.70 dl/g, no blow molded containers excellent in heat resistance, transparency and mechanical strength are obtained and, on the other hand, when said intrinsic viscosity is greater than 0.90 dl/g, moldability and drawing blow moldability of the resulting preforms become poor. In this connection, the intrinsic viscosity [η] as referred to herein, by which the present polyethylene terephthalates are specifically defined, was measured by the following procedure. That is, a specimen of the polyethylene terephthalate was dissolved in o-chlorophenol to measure the solution viscosity with a Ubbelode type capillary viscometer, and thereafter o-chlorophenol was gradually added to measure the solution viscosity at a lower concentration side to obtain the viscosity ([η]) of the solution by the extrapolation of the solution viscosity at the lower concentration side vs. the 0% concentration.

Furthermore, a heat-up crystallizing temperature [Tcc] of the present polyethylene terephthalates at the time when the temperature is elevated at a rate of 10° C./min with a differential scanning calorimeter (DSC) is in the range of at least 165.0° C., preferably from 167.0° to 185° C., and particularly preferably from 168.0° to 180° C. The heat-up crystallizing temperature [Tcc] of the present polyethylene terephthalates in relation to the intrinsic viscosity thereof is in the range represented by the following equation:

$$67.5\,[\eta]+119.0 \leq Tcc\ 67.5\,[\eta]+133.5,\text{ more preferably}$$

$$67.5\,[\eta]+122.5 \leq Tcc\ 67.5\,[\eta]+128.5$$

When the heat-up crystallizing temperature [Tcc] of the present polyethylene terephthalates is lower than 165° C., heat resistance of the resulting blow molded containers decreases, with the result that thermal deformation of said containers takes place at the time when the containers are filled at high temperature with juice or such refrigerant as Coca Cola. Furthermore, when the heat-up crystallizing temperature [Tcc] is lower than the lower limit value of the above-mentioned equation, thermal deformation of the resulting containers is apt to take place likewise at the time when said containers are filled at high temperature with juice or such refrigerant beverage as Coca Cola. In this connection, the heat-up crystallizing temperature [Tcc], by which the present polyethylene terephthalates are specifically defined, was measured by the following procedure. That is, measurement of the heat-up crystallizing temperature [Tcc] was conducted by potting under nitrogen atmosphere into an aluminum pan for liquid a specimen which is about 10 mmg of a thin piece taken out from the central part of the present polyethylene terephthalate chip dried for at least about 5 hours at about 140° C. and under a pressure of about 5 mmHg with DSC-2 Type differential scanning calorimeter, manufactured and sold by Perkin Elmer Co. The conditions under which the measurement was conducted were such that the specimen was first heated rapidly from room temperature to 290° C., at which temperature the specimen was kept for 10 minutes at a molten state and then cooled rapidly to room temperature, and thereafter the top temperature of an exothermal peak detected at the time of elevating the temperature at a heat-up rates of 10° C./min was obtained.

Further, a haze of a plate of 5 mm in thickness molded at 280° C. from the present polyethylene terephthalate is usually in the range of from 2 to 15%, preferably from 3 to 10%, and particularly preferably from 3 to 7%. The haze of the present polyethylene terephthalates in relation to the intrinsic viscosity $[\eta]$ is in the range represented by the following equation:

$$-220\,[\eta]+169 \leq [\text{Haze}] \leq -220\,[\eta]+182,\text{ more preferably}$$

$$-220\,[\eta]+170 \leq [\text{Haze}] \leq -220\,[\eta]+174$$

Measurement of a haze of the present polyethylene terephthalate was conducted according to the following procedure. That is, using an injection molding machine, M-70A-SJ Model manufactured and sold by Meiki Seisakusho K.K., the present polyethylene terephthalate dried for at least 16 hours and under a pressure of about 5 mmHg was subjected to injection molding under the conditions of a cylinder temperature of 260°–275° C. and a mold temperature of about 40° C. with a stepped square plate mold manufactured and sold by Fumakiller K.K., said mold being capable of molding at one time plates of 2, 3, 4, 5, 6 and 7 mm in thickness, respectively. A haze of the stepped square plate of 5 mm in thickness thus obtained was measured with a haze meter, HM-100 Model manufactured and sold by Murakami Color K.K.

Furthermore, the number (a) of spherulites present in the present polyethylene terephthalates formed at the time of melting the polyethylene terephthalates at 290° C. followed by isothermal crystallization at 200° C. is less than $10^8$ pieces/cm$^3$, preferably less than $8 \times 10^7$ pieces/cm$^3$, and particularly preferably less than $5 \times 10^7$ pieces/cm$^3$. The difference [(b)−(a)] between this number (a) of the spherulites and the number (b) of spherulites formed by melting the present polyethylene terephthalate at 280° C. followed by isothermal crystallization at 280° C. is less than $5 \times 10^7$ pieces/cm$^3$, preferably less than $3 \times 10^7$ pieces/cm$^3$, and particularly preferably less than $1 \times 10^7$ pieces/cm$^3$.

This number of spherulites is a value obtained by melting the present polyethylene terephthalate at 290° C. or 280° C. with a differential scanning calorimeter (DSC), then lowering the temperature of the molten polyethylene terephthalate to 200° C. at a rate of 320° C./min. forming spherulites by crystallization for 0.5 hour at 200° C., taking out the spherulites thus formed from a sample pan of DSC, measuring a mean size of the spherulites thus taken out with a polarization microscope, and then obtaining the number of spherulites $N = 1/[(4/3)\pi R^3]$ (R: a radius of spherulite) in accordance with the method of F. Van. Antwerpen, D. W. Van. Krevelan et al. J. Polym. Sci., Polym. Phys. Ed., 10, 2423 (1972).

When the number (a) of spherulites is larger than $10^8$ pieces/cm$^3$ as measured by melting polyethylene terephthalate at 290° C. followed by isothermal crystallization at 200° C., there is a tendency that a preform or blow molded container obtained from such polyethylene terephthalate becomes poor in transparency. Furthermore, the difference [(b)−(a)] between this number (a) of the spherulites and the number (b) of the spherulites as measured by melting the polyethylene terephthalate at 280° C. followed by isothermal crystallization at 290° C. is larger than $5 \times 10^7$ pieces/cm$^3$, there is a similar tendency that a preform or blow molded container obtained from such polyethylene terephthalate becomes poor in transparency.

In conducting measurement of the number of spherulites, there were used as a test specimen a thin piece of about 10 mmg obtained from the central part of the present polyethylene terephthalate dried for at least 5 hours at 140° C. and under a pressure of about 5 mmHg, and DSC-2 Model differential scanning calorimeter manufactured and sold by Perkin Elmer Co. The test specimen was potted into an aluminum pan for liquid and then melted, and then cooled to a given temperature followed by isothermal crystallization. The polyethylene terephthalate was melted at 280° C. and 290° C., respectively, and kept for 10 minutes at these temperatures. Microscopic observation of the spherulites was conducted by first preparing a thin piece of 10 μm from the specimen and then observing it under a polarization microscope manufactured by Nippon Kogaku K.K. at magnification of 300 diameters.

The process of preparing polyethylene terephthalates of the present invention is illustrated below. Concretely, a mixture of terephthalic acid and ethylene glycol is allowed to undergo reaction continuously at the esterification reaction step of at least 2 stages to yield a lower condensate. The lower condensate is further polycondensed continuously under reduced pressure at the liquid phase polycondensation step of at least 2 stages to obtain a polyester. The polyester is melt extruded to form its polyester chips which are then polycondensed in an inert gas atmosphere at the solid phase polymerization step of at least 1 stage, thereby increasing an intrinsic viscosity $[\eta]$ of the resulting polycondensate.

Next, the above-mentioned steps and the conditions under which they are carried out are illustrated hereinafter.

The polyethylene terephthalates of the present invention are obtained by suitably selecting the conditions under which they are conducted and controlling the polycondensation reaction so that (A) the composition of the polyethylene terephthalate, (B) an intrinsic viscosity of the polyethylene terephthalate and (C) the number of spherulites present in the polyethylene terephthalate are in their respective ranges as defined in the present invention.

An ethylene glycol slurry of terephthalic acid is first prepared from a mixture comprising terephthalic acid and 1.02–1.4 moles, preferably 1.03–1.3 moles, based on 1 mole of terephthalic acid, of ethylene glycol. The said slurry is continuously fed to the esterification reaction step. The esterification reaction is carried out using an apparatus in which at least 2 esterification reactors are connected in series under the conditions where ethylene glycol is refluxed, while removing water formed by the reaction outside the system at a rectifying tower. The reaction conditions under which the esterification reaction is carried out are specified as in the following. That is, in a first stage esterification reaction, the temperature employed is usually 240°–270° C., preferably 245°–265° C., and the pressure employed is usually 0.2–3 kg/cm$^2$G, preferably 0.5–2 kg/cm$^2$G. In the final stage esterification reaction, the temperature employed is usually 250°–280° C., preferably 255°–275° C., and the pressure employed is usually 0–1.5 kg/cm$^2$G, preferably 0–1.3 kg/cm$^2$G. Accordingly, where the esterification reaction is carried out in 2 stages, the esterification reaction conditions for the first and second stages are in the ranges above-mentioned ranges, respectively, and where the esterification reaction is carried out in 3 stages or more, the esterification reaction conditions employed in from the second stage to a stage prior to the final stage are those which are in their respective ranges between the above-mentioned first stage reaction conditions and the above-mentioned final stage reaction conditions. For instance, when the esterification reaction is carried out in 3 stages, the reaction temperature employed in the second stage esterification reaction is usually 245°–275° C., preferably 250°–270° C., and the pressure employed is usually 0–2 kg/cm$^2$G, preferably 0.2–1.5 kg/cm$^2$G. Although the rate of reaction in these esterification reactions is not particularly limited in each of their respective stages, it is preferable that an increase and degree of the rate of esterification reaction are smoothly distributed. Further, it is desirable that the esterification reaction product obtained in the final stage usually attains the rate of reaction of at least 90%, preferably at least 93%. By carrying out these esterification steps, there is obtained a lower condensate which usually has a number average molecular weight of 500–5000.

The lower condensate thus obtained is continuously fed to a polycondensation wherein the subsequent liquid phase polycondensation step of said lower condensate is carried out. The reaction conditions under which said liquid phase polycondensation step is carried out are defined as in the following. That is, in a first stage polycondensation, the reaction temperature employed is usually 260°–290° C., preferably 265°–290° C., and more preferably 270°–285° C., and the pressure employed is usually 500–20 Torr, preferably 200–30 Torr, and the temperature employed in a final stage polycondensation reaction is usually 270°–300° C., preferably 275°–295° C., and the pressure employed is usually 10–0.1 Torr, preferably 5–0.5 Torr.

In particular, when the reaction temperature employed in the first stage polycondensation is 265°–285° C., there is obtained a polyethylene terephthalate in which the number (a) of spherulites formed by melting the resulting polyethylene terephthalate at 290° C. followed by isothermal crystallization at 200° C. is less than 10$^8$ pieces/cm$^3$ and the difference [(b)−(a)] between this number (a) of spherulites and the number (b) of spherulites formed by melting said polyethylene terephthalate at 280° C. followed by isothermal crystallization at 200° C. is less than 5×10$^7$ pieces/cm$^3$.

Where the polycondensation reaction is carried out in 2 stages, the polycondensation reaction conditions for the first and second stages are respectively in the above-mentioned ranges, and where the polycondensation reaction is carried out in 3 stages or more, the reaction conditions employed in from the second stage to a stage prior to the final stage are those in their respective ranges between the first stage reaction conditions and the final stage reaction conditions. For instance, when the polycondensation reaction is carried out in 3 stages, the reaction temperature employed in the second stage polycondensation reaction is usually 265°–295° C., preferably 270°–290° C., and more preferably 270°–285° C., and the pressure employed is usually 50–2 Torr, preferably 40–5 Torr. Although an intrinsic viscosity $[\eta]$ of a polyethylene terephthalate attained in each of these polycondensation steps is not particularly limited, it is preferable that the degree of an increase in the intrinsic viscosity is smoothly distributed in each step, and the intrinsic viscosity $[\eta]$ of the polyethylene terephthalates obtained from the final stage polycondensation reactor is usually in the range of from 0.55 to 0.70 dl/g, preferably from 0.57 to 0.68 dl/g. The polyethylene terephthalate thus obtained from the final stage polycondensation reactor is then molded by the melt extrusion molding technique into chips.

The chips of this polyethylene terephthalate is then fed to solid phase polycondensation step. The solid phase polycondensation step comprises at least one stage, wherein the solid phase polycondensation reaction is carried out in an atmosphere of inert gas such as nitrogen gas, argon gas or carbonic acid gas under the conditions where the polycondensation temperature is usually 190°–230° C., preferably 195°–225° C., and the pressure is usually 1 kg/cm$^2$ – 10 Torr, preferably ordinary pressure to 100 Torr. Of these inert gases, preferred is nitrogen gas.

The aforementioned esterification reaction may also be carried out without addition of any additives other than terephthalic acid and ethylene glycol, and said reaction may also be carried out in the coexistence of catalysts for polycondensation, which will be mentioned later. However, it is preferable to carry out this esterification reaction by further addition of small amounts of tertiary amines such as triethylamine, tri-n-butylamine, tetra-n-butylamine, benzyldimethylamine, etc., quaternary ammonium hydroxides such as tetraethylammonium hydroxide, tetra-n-butylammonium hydroxide, trimethylbenzylammonium hydroxide, etc., and basic compounds such as lithium carbonate, sodium carbonate, potassium carbonate, sodium acetate, etc., since the proportion of dioxyethylene terephthalate repeating unit in the main chain of polyethylene terephthalate obtained can be maintained at a relatively low level.

The method of addition to the esterification reaction steps of these base component unit containing compounds is not particularly limited, and such compounds may be added to all the esterification reactors used. Furthermore, the polycondensation reaction is preferably carried out in the presence of catalysts and stabilizers. Usable as the catalysts are germanium compounds such as germanium dioxide, germanium tetraethoxide, germanium tetra-n-butoxide, etc. Of these catalysts, preferred is the germanium compound since when it is used, the resulting polyethylene terephthalate is excellent in color hue and transparency. Useful stabilizers include phosphoric acid esters such as trimethyl phosphate, triethyl phosphate, tri-n-butyl phosphate, trioctyl phosphate, triphenyl phosphate, tricresyl phosphate, etc., phosphorous acid esters such as triphenyl phosphite, tridodecyl phosphite, trinonylphenyl phosphite, etc., acid phosphoric esters such as methyl acid phosphate, isopropyl acid phosphate, butyl acid phosphate, dibutyl phosphate, monobutyl phosphate, dioctyl phosphate, and phosphorus compounds such as phosphoric acid, polyphosphoric acid, etc. Based on the weight of the mixture of terephthalic acid and ethylene glycol, the proportion of the catalyst used is usually in the range of from 0.0005 to 0.2% by weight, preferably from 0.001 to 0.05% by weight in terms of the weight of metal in the catalyst, and that of the stabilizer is usually in the range of from 0.001 to 0.1% by weight, preferably from 0.002 to 0.02% by weight in terms of the weight phosphorus atom in the stabilizer. These catalysts and stabilizers may be fed at the stage of the esterification reaction step and also to the first stage reactor in the polycondensation reaction step.

The preforms for blow molded articles of the present invention are obtained, according to the usual method, by molding the above-mentioned polyethylene terephthalate into preforms. The present preforms for blow molded articles may be those for monolayer blow molded articles molded from the said polyethylene terephthalate or may be those for multilayer blow molded articles molded from a layer of the said polyethylene terephthalate and a layer of such resin as gas barrier resin other than polyethylene terephthalate.

The polyethylene terephthalates of the present invention to constitute preforms for blow molded articles may suitably be incorporated, if necessary, with various kinds of additives such as known nucleating agents, inorganic fillers, lubricants, stabilizers, antistatic agents, anti-fog additives, pigments, etc. Where the preforms molded from the present polyethylene terephthalates are monolayer preforms for monolayer blow molded articles, said polyethylene terephthalates may also be incorporated further, if necessary, with resins other than polyethylene terephthalate, such as those which are conventionally known to have gas barrier properties. The proportion of such resins to be added is in the range selected suitably.

The preforms for blow molded articles of the present invention may be prepared by any methods known, per se. For instance, monolayer preforms can be molded by the injection molding technique, and the aforementioned multilayer preforms can also be molded by the multilayer injection molding technique and also may be prepared by the method wherein tubular articles having a lamination structure similar to the multilayer preforms are molded and processed. In particular, when preforms are molded by the injection molding process from the present polyethylene terephthalates, the productivity of the molding of the preforms can greatly be increased since staining and clogging of an air vent portion of metal mold can be lessened, thereby decreasing frequency of cleaning of the metal mold.

The blow molded containers of the present invention are prepared by drawing-blow molding the aforementioned preforms for blow molded articles. The blow molded containers of the present invention may be monolayer blow molded containers formed from the aforesaid polyethylene terephthalates in the same manner as in the aforesaid preforms for blow molded articles and also may be multilayer blow molded containers formed from a layer of said polyethylene terephthalates and a layer of resins other than polyethylene terephthalate, such as resins having gas barrier properties.

In the multilayer blow molded containers of the present invention, the wall of the container is in the form of a laminate comprising a main thick layer of the present polyethylene terephthalate and a thin layer of the aforesaid gas barrier resin other than polyethylene terephthalate, wherein the resin layer other than the polyethylene terephthalate layer may be present as the outermost layer, the innermost layer or the interlayer.

Polyethylene terephthalates which constitute the present blow molded containers may be suitably incorporated, if necessary, with various kinds of additives known, per se, such as nucleating agents, inorganic fillers, lubricants, slip agents, anti-blocking agents, stabilizers, antistatic agents, anti-fog additives, pigments, etc. Furthermore, where the present blow molded containers are containers of a single-layer consisting essentially of the above-mentioned polyethylene terephthalate, said polyethylene terephthalate can also be incorporated, if necessary, with resins other than polyethylene terephthalate, such as resins conventionally known to have gas barrier properties. The proportion of such resins to be incorporated is in the range suitably selected.

The blow molded containers of the present invention are usually drawn, and they may be monoaxially stretched blow molded containers and also they may be biaxially stretched blow molded containers. When the blow molded containers are monoaxially stretched blow molded containers, the draw ratio employed is usually in the range of 1.1-10 times, preferably 1.2-8 times. In the case of biaxially stretched blow molded containers, the draw ratio employed in the lengthwise direction is usually in the range of 1.1-8 times, preferably 1.2-7 times, and more preferably 1.5-6 times, and the draw ratio in the lateral direction is usually in the range of 1.1-8 times, preferably 1.2-7 times, and more preferably 1.5-6 times.

When the polyethylene terephthalates are used in the preparation of blow molded containers, staining of blow metal molds used in monoaxial drawing-blow molding or biaxial drawing-blow molding operations can be decreased in comparison with the cases of prior art operations, thereby reducing the frequency of cleaning said blow metal molds. Therefore, the productivity of the blow molded containers can be greatly increased at the time of monoaxial or biaxial drawing-blow molding operations.

The blow molded containers of the present invention are prepared by drawing-blow molding the aforementioned preforms for blow molded articles. For instance, the preform is first heated and drawn in the lengthwise direction and thereafter the drawn preform is further drawn in the lateral direction by subjecting it to blow molding. In practicing the blow molding, the heating temperature of the preform is usually in the range of 80°-130° C., preferably 85°-125° C., and the temperature of blow molding metal mold is usually in the range of from ordinary temperature to 200° C., preferably 40°-180° C. The blow molded containers thus prepared are subjected to heat setting according to the method known, per se, wherein the heat setting temperature employed is usually in the range of 110°-170° C., preferably 120°-160° C.

The present invention is illustrated below with reference to examples.

Example 1

Polyethylene terephthalate was prepared by continuous polycondensation according to the following operations, using such a continuous polycondensation apparatus as shown in FIG. 1, wherein the first, second, third, fourth and fifth reactors 3, 4, 5, 6 and 7, respectively, are each of the tank type, and the sixth reactor 8 is a two-stage rotary type horizontal reactor.

To the first reactor 3 previously retained therein 3750 parts by weight of a reaction liquid and having been kept with stirring at 255° C. and 1.7 kg/cm²G was continuously fed a slurry via slurry pump 9, slurry storage tank 2 and slurry forming tank 1, being prepared by mixing 1437 parts/hr by weight of high purity terephthalic acid (T) and 645 parts/hr by weight of ethylene glycol (E) to effect a first stage esterification reaction. In this first esterification reaction, a mixed liquid comprising 203 parts by weight of water and 3 parts by weight of ethylene glycol was removed from the system. A reaction product of this first stage esterification reaction as formed was introduced into the second reactor 4 which had been so controlled that an average retention time of the reactants therein becomes 2.0 hours and the inside thereof is kept with continuous stirring at 260° C. and 0.8 kg/cm²G. In this second reactor, a homogeneous mixed solution of 0.35 part/hr by weight of germanium dioxide and 32 parts/hr by weight of ethylene glycol was charged and, at the same time, a mixed liquid of 84 parts/hr by weight of water and 7 parts/hr by weight of ethylene glycol was distilled off continuously, thus the second stage esterification reaction was continued. A reaction product of this second stage esterification reaction was introduced into the third reactor 5 which had been so controlled that an average retention time of the reactants therein becomes 2.0 hours and the inside thereof is kept with continuous stirring at 265° C. and ordinary pressure. In this third reactor, a homogeneous solution of a mixture comprising 1.23 parts/hr by weight of trimethyl phosphate and 22 parts/hr by weight of ethylene glycol was continuously charged and, at the same time, a mixed liquid of 21 parts/hr by weight of water and 38 parts/hr by weight of ethylene glycol was distilled off continuously, thus the third stage esterification reaction was continued.

A reaction product of this third stage esterification reaction as formed was introduced into the fourth reactor 6 which had been so controlled that an average retention time of the reactants therein becomes 2.0 hours and the inside thereof is kept with continuous stirring at 275° C. and 70 mmHg. In this fourth reactor, a mixture comprising 62 parts/hr by weight of water and 6 parts/hr by weight of ethylene glycol was distilled off, and a first stage polycondensation reaction was effected. A reaction product of this first stage polycondensation reaction was introduced into the fifth reactor 7 which had been so controlled that an average retention time of the reactants therein becomes 1.0 hour and the inside thereof is kept with continuous stirring at 280° C. and 5 mmHg.

In this fifth reactor, a mixed solution comprising 26 parts/hr by weight of water and 3 parts/hr by weight of ethylene glycol was distilled off, and a second stage polycondensation reaction was continued. A reaction product of this second stage polycondensation reaction as formed was introduced into the sixth reactor which is a two-stage rotary type horizontal reactor 8 and which had been so controlled that an average retention time of the reactants therein becomes 1.0 hour and the inside thereof is kept with continuous stirring at 282°-285° C. and 1.8 mmHg.

In this sixth reactor, a reaction liquid comprising 12 parts/hr by weight of ethylene glycol and 1 part/hr by weight of water was distilled off, and a third stage polycondensation reaction was continued. A reaction product of this third stage polycondensation reaction as formed was withdrawn continuously in the form of strand outside the reactor through a polyester withdrawing apparatus 16 which had been so controlled that an average retention time of the polyester therein becomes 2.5 hours, and after cooling by immersion in water, the strand of the polyester thus withdrawn was cut into chips by means of a strand cutter. The polyethylene terephthalate obtained by liquid phase polymerization as mentioned above had an intrinsic viscosity $[\eta]$ of 0.62 dl/g as measured at 25° C. in o-chlorophenol and the dioxyethylene content of 2.50 mol %.

The polyethylene terephthalate obtained by the liquid phase polymerization was dried for about 15 hours at about 140° C. in a nitrogen atmosphere and, at the same time, was crystallized, and thereafter, the thus treated polyethylene terephthalate was filled in a tower type solid phase polymerizer to effect solid phase polymerization thereof for 15 hours at 205° C. in a nitrogen atmosphere. The polyethylene terephthalate thus obtained had an intrinsic viscosity $[\eta]$ of 0.8 dl/g as measured at 25° C. in o-chlorophenol, the dioxyethylene terephthalate content of 2.53 mol %, and a heat-up crystallization temperature Tcc of 174° C. Furthermore, the number of spherulites formed at the time of melting this polyethylene terephthalate at 290° C., followed by isothermal crystallization at 200° C. was $5 \times 10^7$ pieces/cm³, and the difference between this number of the spherulites and the number of spherulites formed at the time of melting this polyethylene terephthalate at 280° C., followed by isothermal crystallization at 200° C. was 3×10⁷ pieces/cm³.

Subsequently, the polyethylene terephthalate prepared by the solid phase polymerization mentioned above was dried for about 16 hours at about 140° C. and a reduced pressure of about 5 mmHg, and then subjected to injection molding with a stepped square plate metal mold capable of molding, at one time, plates of 2, 3, 4, 5, 6 and 7 mm in thickness, respectively, under the conditions where the cylinder temperature is 260°–275° C. and the metal mold temperature is about 40° C., using an injection molding machine, M-70A-SJ Model manufactured and sold by Meiki Seisakusho K.K., whereby step square plates were obtained. Of the stepped square plate thus obtained, the plate of 5 mm in thickness was measured for haze with a haze meter, HM-100 Model, manufactured and sold by Murakami Color K.K., whereupon the measured value of haze was 4.8%.

Examples 2–3

The solid phase polymerization of the polyethylene terephthalate obtained by the liquid phase polymerization in Example 1 was repeated in the same manner as in Example 1 except that the polymerization conditions employed were as indicated in Table 1. An intrinsic viscosity [η], the dioxyethylene terephthalate content and a heat-up crystallization temperature of the polyethylene terephthalates thus obtained were as indicated in Table 1.

Further, stepped square plates were molded in the same manner as in Example 1, and the plates each of 5 mm in thickness were measured for haze to obtain their respective results as shown in Table 1.

thereof is kept with continuous stirring at 260° C. and 0.8 kg/cm². In this third reactor, a homogeneous solution comprising 0.35 part/hr by weight of germanium dioxide and 32 parts/hr by weight of ethylene glycol was charged continuously and, at the same time, a mixture comprising 87 parts/hr by weight of water and 7 parts/hr by weight of ethylene glycol was distilled off continuously, and the second stage esterification reaction was continued. A reaction product of this second stage esterification reaction was introduced into a fourth reactor which had been so controlled that an average retention time of the reactants therein becomes 2.0 hour and the inside thereof is kept with continuous stirring at 265° C. and under ordinary pressure.

In this fourth reactor, a homogeneous solution prepared by mixing 0.20 part/hr by weight of methyl acid phosphate with 22 parts/hr by weight of ethylene glycol was continuously charged and, at the same time, a mixed liquid comprising 22 parts/hr by weight of water and 40 parts/hr by weight of ethylene glycol was continuously distilled off, and the third stage esterification was continued. A reaction product of this third stage esterification reaction was introduced into a fifth reactor which had been so controlled that an average retention time of the reactants therein becomes 2.0 hours and the inside thereof is kept with continuous stirring at 277° C. and 50 mmHg.

In this fifth reactor, a mixed liquid comprising 72 parts/hr by weight of ethylene glycol and 5 parts/hr by weight of water was continuously distilled off, and a first stage polycondensation reaction was effected. A reaction product of this first stage polycondensation reaction as formed was introduced into a sixth reactor

TABLE 1

| | Solid phase polymerization conditions | | | | | Number of spherulites | | | |
| --- | --- | --- | --- | --- | --- | --- | --- | --- | --- |
| Example | Polymerization temperature (°C.) | Polymerization time (hr) | Intrinsic viscosity [η] (dl/g) | Dioxyethylene terephthalate content (mol %) | Melting at 290° C. crystallizing at 200° C. | (Melting at 280° C. crystallizing at 200° C.) − (Melting at 290° C. crystallizing at 200° C.) | Heat-up crystallization temperature (Tcc) (°C.) | Thickness of stepped square plate Haze of 5 mm thick plate (%) |
| 2 | 200 | 12 | 0.76 | 2.51 | 9 × 10⁷ pc./cm³ | 4 × 10⁷ pc./cm³ | 172 | 11.3 |
| 3 | 215 | 11 | 0.85 | 2.52 | 6 × 10⁷ pc./cm³ | 4 × 10⁷ pc./cm³ | 176 | 2.9 |

Example 4

Using an apparatus shown in FIG. 1 but without using the first reactor, while connecting an outlet piping of a slurry pump 9 to a second reactor 4, polyethylene terephthalate was prepared by continuous liquid phase polymerization conducted in the following manner.

To the second reactor having previously retained therein 3757 parts by weight of a reaction liquid and having been kept with stirring at 250° C. and 1.5 kg/cm² under a nitrogen atmosphere was continuously fed a slurry prepared by mixing 1437 parts/hr by weight of high purity terephthalic acid with 645 parts/hr by weight of ethylene glycol to effect a first stage esterification reaction.

In this first stage esterification reaction, a mixture comprising 196 parts/hr by weight of water and 3 parts/hr by weight of ethylene glycol was distilled off. This reaction product of the first stage esterification reaction as formed was introduced into a third reactor which had been so controlled that an average retention time of the reactants becomes 2.0 hour and the inside which had been so controlled that an average retention time of the reactants therein becomes 2.0 hours and the inside thereof is kept with continuous stirring at 282°–285° C. and 1.5–2.0 mmHg.

In this sixth reactor, a mixed liquid comprising 26 parts/hr by weight of ethylene glycol and 1 part/hr by weight of water was continuously distilled off, and a second stage polycondensation reaction was continued. A reaction product of this second stage polycondensation reaction as formed was withdrawn continuously in the same manner as in Example 1 through a polyester withdrawing apparatus which had been so controlled that an average retention time of the polyester therein becomes 2.8 hours, and the cooled followed by cutting into chips. An intrinsic viscosity [η] and the dioxyethylene terephthalate content of the polyethylene terephthalate obtained by this liquid phase polymerization were measured in the same manner as in Example 1, whereupon they were 0.62 dl/g and 2.54 mol %, respectively.

The polyethylene terephthalate obtained in this liquid phase polymerization was dried in the same manner as in Example 1 and then solid phase polymerized using the same apparatus as in Example 1 under the same conditions. As the result, the polyethylene terephthalate obtained had an intrinsic viscosity [η] of 0.79 dl/g and the dioxyethylene terephthalate content of 2.55 mol %. The number (a) of spherulites formed at the time of melting this polyethylene terephthalate at 290° C. followed by isothermal crystallization at 200° C. was $6 \times 10^7$ pieces/cm$^3$, and a heat-up crystallization temperature Tcc was 168° C. The difference between the number (b) of spherulites formed at the time of melting this polyethylene terephthalate at 280° C. followed by isothermal crystallization and the number (a) was $7 \times 10^7$ pieces/cm$^3$.

Subsequently, the polyethylene terephthalate prepared by this solid phase polymerization was dried in the same manner as in Example 1 and then molded into stepped square plate using the same apparatus as in Example 1 under the same conditions. Of the stepped square plates thus obtained, the plate of 5 mm in thickness was measured for haze in the same manner as in Example 1, whereupon the measured value of haze was 7.1%.

Comparative Example 1

Using an apparatus shown in FIG. 1 but without using the first, third, fourth and sixth reactors, while connecting an outlet piping of a slurry pump 9 to the second reactor 4 and an outlet piping of the second reactor to the fifth reactor, polyethylene terephthalate was prepared by effecting esterification reaction in the second reactor and then effecting polycondensation reaction in the fifth reactor 7 in the following manner.

In the second reactor which had been maintained at 180° C. and 1.5 kg/cm$^2$ under a nitrogen atmosphere, was filled a slurry prepared as a mixture comprising 2874 parts by weight of high purity terephthalic acid and 1235 parts by weight of ethylene glycol, and was further fed with stirring a homogeneous solution of 0.70 part by weight of germanium dioxide and 30 parts by weight of ethylene glycol. Subsequently, while maintaining the pressure at 1.5 kg/cm$^2$, the temperature was elevated over about 30 minutes to 255° C. to initiate esterification reaction. While controlling the ethylene glycol content in effluent water becomes less than 5% by weight, the esterification reaction was continued for 6.4 hours at 255° C. under a pressure of 1.5 kg/cm$^2$. In this esterification reaction, a mixed liquid comprising 605 parts by weight of water and 30 parts by weight of ethylene glycol was distilled off.

After completion of the esterification reaction, the pressure within the reactor was brought back to ordinary pressure, then a mixed solution comprising 0.40 part by weight of methyl acid phosphate and 24 parts by weight of ethylene glycol was added to the reactor to retain the reactants with stirring for about 15 minutes therein. Subsequently, a reaction product of this esterification reaction as formed was transferred to the fifth reactor which had been maintained at 260° C. and ordinary pressure under a nitrogen atmosphere. Subsequently, the pressure within the fifth reactor was brought back to about 1 mmHg and, at the same time, the temperature within said reactor was raised up to 275° C. to initiate polycondensation reaction. The polycondensation reaction was effected for about 1.5 hours at 275° C. while maintaining the degree of vacuum within the reactor at about 1 mmHg and further continued for about 1 hour by raising the temperature up to 285° C. In this polycondensation reaction, a mixed liquid comprising 157 parts by weight of ethylene glycol and 26 parts by weight of water was distilled off.

After completion of the polycondensation reaction, the pressure within the reactor was brought with nitrogen to ordinary pressure and a polyethylene terephthalate as formed was withdrawn over about 25 minutes through a polyester withdrawing apparatus 15, cooled and cut into chips in the same manner as in Example 1. An intrinsic viscosity [η] and the dioxyethylene terephthalate of the polyethylene terephthalate obtained by this liquid phase polymerization were measured in the same manner as in Example 1 to obtain the measured values of 0.61 dl/g and 2.57 mol %.

Further, the polyethylene terephthalate obtained in that liquid phase polymerization was dried in the same manner as in Example 1 and then solid polymerized using the same apparatus as in Example 1. As the result, the polyethylene terephthalate obtained had an intrinsic viscosity [η] of 0.79 dl/g, the dioxyethylene terephthalate content of 2.57 mol % and a heat-up crystallization temperature Tcc of 147° C. The number (a) of spherulites formed by melting the polyethylene terephthalate at 290° C. followed by isothermal crystallization at 200° C. was $9 \times 10^7$ pieces/cm$^3$, and the difference between this number (a) of the spherulites and the number (b) of spherulites formed by melting the polyethylene terephthalate at 280° C. followed by isothermal crystallization at 200° C. was $1.2 \times 10^8$ pieces/cm$^3$.

Subsequently, the polyethylene terephthalate prepared by this solid phase polymerization was dried in the same manner as in Example 1 and then formed into stepped square plates using the same apparatus as in Example 1 under the same conditions. Of the stepped plates obtained, the plate of 5 mm in thickness was measured for haze in the same manner as in Example 1 to obtain the measured haze value of 27%.

Example 5

The polyethylene terephthalate obtained by solid phase polymerization of Example 1 was dried for about 15 hours at about 140° C. under a nitrogen atmosphere, melted at the molding temperature of about 280° C. with an injection molding machine, and injection molded through a preform metal mold cooled to 10° C. at the molding pressure of about 800 kg/cm$^2$ to prepare a preform of 28 mm in outside diameter and 4 mm in thickness. The preform thus prepared was crystallized only on the portion of stopper by treating said portion with an oil bath at 160° C. to prepare a preform having a crystallized stopper portion. Using a biaxial stretching blow molding machine (LBO1, manufactured and sold by CORPO-PLAST Co.), this preform was biaxially stretched about 2 times lengthwise and about 3 times laterally under the conditions of a blowing pressure of about 20 kg/cm$^2$, preform heating time of about 60 seconds and stretching temperature of about 100° C., and after holding the stretched preform for about 10 seconds within a metal mold having the surface temperature of about 140° C., the preform was subjected to heat setting by means of cooling the metal mold to prepare a biaxially stretched bottom-raised bottle having an internal volume of 1.0 liter with 6 pieces of reduced panels on the body portions thereof. The bottle thus prepared was found favorable in transparency.

Subsequently, this bottle was filled with hot water of 85° C., allowed to stand for 10 minutes at room temperature, and cooled by immersion in water of about 25° C. to investigate the shape of the bottle, whereupon no deformation was observed at all.

Examples 6-8

Biaxially stretched bottles were molded respectively from the polyethylene terephthalates obtained by solid phase polymerization in Examples 2, 3 and 4 in the same manner as in Example 5 except that the biaxial stretching blow molding conditions employed were respectively as indicated in Table 2. The bottles obtained were favorable in transparency. Further, these biaxially stretched bottles obtained were subjected respectively to bottle deformation test in the same manner as in Example 5, whereupon no deformation was observed at all in every bottle.

Comparative Examples 2-3

Biaxially stretched bottles were prepared from polyethylene terephthalate obtained by solid phase polymerization of Comparative Example 1 under the same conditions as in Examples 5, 6 and 7, respectively. A slight whitening was observed in the bottle body portions of the bottles thus prepared. Further, these bottles obtained were subjected to bottle deformation test in the same manner as in Example 5. As the result, in every bottle, there were observed shrinkage on the bottle shoulder portion and swelling on the panel portions of the bottle body.

TABLE 2

| Example | Blow molding conditions | | | Heat setting conditions | |
|---|---|---|---|---|---|
| | Pressure (kg/cm²) | Preform heating time (seconds) | Stretching temperature (°C.) | Temperature (°C.) | Time (seconds) |
| 6 | 20 | 60 | 103 | 130 | 10 |
| 7 | 20 | 60 | 100 | 140 | 10 |
| 8 | 25 | 55 | 98 | 150 | 10 |

What is claimed is:

1. A polyethylene terephthalate characterized by having
   (A) an ethylene terephthalate repeating unit (a) represented by the general formula (I)

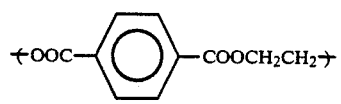

(I)

said unit (a) being in the range of from 97.0 to 98.6 mol %, and a dioxyethylene terephthalate repeating unit (b) represented by the general formula (II)

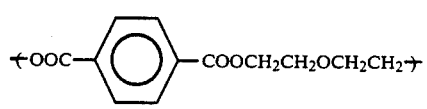

(II)

said unit (b) being in the range of from 1.4 to 3.0 mol %, and said two repeating units being random oriented,
   (B) an intrinsic viscosity ($\eta$) as measured of 25° C. in o-chlorophenol being in the range of from 0.70 to 0.90 dl/g,
   (C) a crystallizing temperature (Tcc) as measured at a heat-up rate of 10° C./min with a differential scanning calorimeter being at least 165° C., and said heat-up crystallizing temperature (Tcc) in relation to said intrinsic viscosity ($\eta$) being in the range represented by the following equation $67.5 (\eta) + 119.0 \leq (Tcc) \leq 67.5 (\eta) + 133.5$, and
   (D) the number (a) of spherulites formed by isothermal crystallization of said polyethylene terephthalate at 200° C. after melting up to 290° C. being less than $10^8$ pieces/cm³, the difference ((b)−(a))l between said number (a) of the spherulites and the number (b) of spherulites formed by isothermal crystallization of said polyethylene terephthalate at 200° C. after melting up to 280° C. being less than $5 \times 10^7$ pieces/cm³; and
   (E) a plate of 5 mm in thickness molded at 280° C. from said polyethylene terephthalate has a haze of from 2 to 15%.

2. A preform for use in molding blow molded articles, which is preformed from a polyethylene terephthalate characterized by having
   (A) an ethylene terephthalate repeating unit (a) represented by the general formula (I)

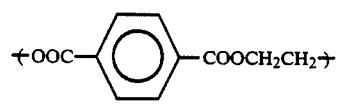

(I)

said unit (a) being in the range of from 97.0 to 98.6 mol %, and a dioxyethylene terephthalate repeating unit (b) represented by the general formula (II)

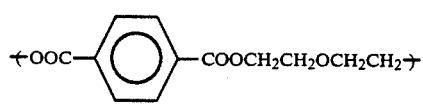

(II)

said unit (b) being in the range of from 1.4 to 3.0 mol %, and said two repeating units being random oriented,
   (B) an intrinsic viscosity ($\eta$) as measured of 25° C. in o-chlorophenol being in the range of from 0.70 to 0.90 dl/g,
   (C) a crystallizing temperature (Tcc) as measured at a heat-up rate of 10° C./min with a differential scanning calorimeter being at least 165° C., and said heat-up crystallizing temperature (Tcc) in relation to said intrinsic viscosity ($\eta$) being in the range represented by the following equation $67.5 (\eta) + 119.0 \leq (Tcc) \leq 67.5 (\eta) + 133.5$, and
   (D) the number (a) of spherulites formed by isothermal crystallization of said polyethylene terephthalate at 200° C. after melting up to 290° C. being less than $10^8$ pieces/cm³, the difference ((b)−(a)) between said number (a) of the spherulites and the number (b) of spherulites formed by isothermal crystallization of said polyethylene terephthalate at 200° C. after melting up to 280° C. being less than $5 \times 10^7$ pieces/cm³; and (E) a plate of 5 mm in thickness molded at 280° C. from said polyethylene terephthalate has a haze of from 2 to 15%.

3. A blow molded container formed from a polyethylene terephthalate characterized by having (A) an ethylene terephthalate repeating unit (a) represented by the general formula (I)

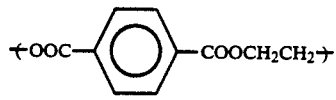 (I)

said unit (a) being in the range of from 97.0 to 98.6 mol %, and a dioxyethylene terephthalate repeating unit (b) represented by the general formula (II)

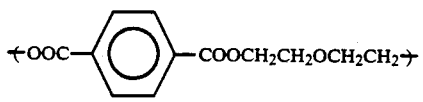 (II)

said unit (b) being in the range of from 1.4 to 3.0 mol %, and said two repeating units being random oriented, (B) an intrinsic viscosity ($\eta$) as measured of 25° C. in o-chlorophenol being in the range of from 0.70 to 0.90 dl/g, (C) a crystallizing temperature (Tcc) as measured at a heat-up rate of 10° C./min with a differential scanning calorimeter being at least 165° C., and said heat-up crystallizing temperature (Tcc) in relation to said intrinsic viscosity ($\eta$) being in the range represented by the following equation $67.5(\eta)+119.0 \leq (Tcc) \leq 67.5(\eta)+133.5$, and (D) the number (a) of spherulites formed by isothermal crystallization of said polyethylene terephthalate at 200° C. after melting up to 290° C. being less than $10^8$ pieces/cm$^3$, the difference ((b)−(a)) between said number (a) of the spherulites and the number (b) of spherulites formed by isothermal crystallization of said polyethylene terephthalate at 200° C. after melting up to 280° C. being less than $5 \times 10^7$ pieces/cm$^3$; and (E) a plate of 5 mm in thickness molded at 280° C. from said polyethylene terephthalate has a haze of from 2 to 15%.

4. The polyethylene terephthalate according to claim 1 characterized by having (A) repeating unit (a) in amount of from 97.1 to 98.5 mole %, and repeating unit (b) in amount of from 1.5 to 2.9 mole %;

(B) an intrinsic viscosity ($\eta$) in the range of from 0.71 to 0.87 dl/g;

(C) Tcc of from 167.0° to 180° C., and $67.5(\eta)+122.5 \leq Tcc \leq 67.5(\eta)+128.5$;

(D) the number (a) of spherulites being less than $8 \times 10^7$ pieces, and the difference between the numbers of spherulites (b)−(a) being less than $3 \times 10^7$; and wherein (E) a plate 5 mm in thickness molded at 280° C. from said polyethylene terephthalate has a haze of from 3 to 10%.

5. The polyethylene terephthalate according to claim 1 characterized by having (A) repeating unit (a) in amount of from 97.3 to 98.3 mole %, and repeating unit (b) in amount of from 1.7 to 2.7 mole %;

(B) an intrinsic viscosity ($\eta$) in the range of from 0.72 to 0.85 dl/g;

(C) Tcc of from 167.0° to 180° C., and $67.5(\eta)+122.5 \leq Tcc \leq 67.5(\eta)+128.5$;

(D) the number (a) of spherulites being less than $5 \times 10^7$ pieces, and the difference between the numbers of spherulites (b)−(a) being less than $1 \times 10^7$; and wherein (E) a plate 5 mm in thickness molded at 280° C. from said polyethylene terephthalate has a haze of from 3 to 7%.

* * * * *